United States Patent [19]

Mainord

[11] 3,859,386

[45] Jan. 7, 1975

[54] EMULSIFIABLE POLYOLEFIN COMPOSITIONS COMPOSITIONS PREPARED FROM THERMALLY DEGRADED LOW MOLECULAR WEIGHT POLYOLEFIN AND CROTONIC ACID

[75] Inventor: Kenneth R. Mainord, Longview, Tex.

[73] Assignee: Eastman Kodak Company, Rochester, N.Y.

[22] Filed: July 20, 1973

[21] Appl. No.: 381,133

[52] U.S. Cl........... 260/878 R, 117/139.4, 117/161, 260/28.5 A, 260/78.4 D, 260/88.2 S, 260/93.7, 260/94.9 GC, 260/94.9 GD
[51] Int. Cl. ............................................ C08f 27/00
[58] Field of Search...... 260/88.1 R, 28.5 A, 878 R, 260/94.9 GC, 94.9 GD

[56] References Cited
UNITED STATES PATENTS

| | | | |
|---|---|---|---|
| 2,766,214 | 10/1956 | Erchak et al. | 260/94.9 GC |
| 2,928,816 | 3/1960 | Chapman et al. | 260/94.9 GC |
| 3,201,381 | 8/1965 | Hagemeyer et al. | 260/94.9 GC |
| 3,236,917 | 2/1966 | Natta et al. | 260/878 R |
| 3,687,905 | 8/1972 | Dorer | 260/94.9 GC |

Primary Examiner—Harry Wong, Jr.

[57] ABSTRACT

Emulsifiable polyolefin waxes are prepared by reacting low molecular weight homo- and copolymers containing at least one alphaolefin monomer having at least three carbon atoms with crotonic acid in the presence of a free radical source. These emulsifiable polyolefin waxes form excellent nonionic emulsions which are useful as low color floor polishes.

11 Claims, No Drawings

EMULSIFIABLE POLYOLEFIN COMPOSITIONS COMPOSITIONS PREPARED FROM THERMALLY DEGRADED LOW MOLECULAR WEIGHT POLYOLEFIN AND CROTONIC ACID

This invention relates to modified poly-α-olefin polymers having improved physical properties and the process for preparation thereof. One of the aspects of this invention concerns a novel process for preparing emulsifiable low molecular weight poly-α-olefin compositions. Another aspect of this invention concerns the novel reaction product prepared by reacting low molecular weight poly-α-olefins and crotonic acid in the presence of a free radical source.

It is known in the art to react low molecular weight poly-α-olefins such as polypropylene, with polycarboxylic compounds such as maleic anhydride to prepare emulsifiable waxes. These waxes are useful components of floor polishes and in particular impart outstanding slip resistance to floor polish films. However, these emulsifiable polypropylene waxes prepared by reacting maleic anhydride with a low molecular weight polypropylene in the presence of a peroxide catalyst have the disadvantage of being colored. For example, one such maleic anhydride modified polypropylene wax having an acid number of 45 has a melt Gardner color of from 9 to 13. This color has prevented wide spread use of such emulsifiable waxes in floor polishes where clarity is a requirement.

Accordingly, it is one of the objects of the invention to provide novel emulsifiable poly-α-olefin waxes having improved physical properties.

Another object of this invention is to provide poly-α-olefin compositions having excellent clarity.

A further object of the invention is to provide an emulsifiable poly-α-olefin composition.

Still another object of the invention is to prepare emulsifiable low molecular weight crystallizable poly-α-olefin compositions exhibiting high hardness properties.

A still further object of this invention is to improve the emulsifiability of unemulsifiable poly-α-olefin compositions by reacting the unemulsifiable poly-α-olefin with crotonic acid.

Another object is to provide a process for producing poly-α-olefin compounds which have good color and are readily emulsifiable.

A further object is to provide poly-α-olefin emulsions which are clear and stable.

Further objects and advantages of the invention will be apparent to those skilled in the art from the accompanying disclosure and claims.

In accordance with this invention, it has been found that low viscosity homopolymers and copolymers of alpha-monoolefins containing at least one alpha-olefin monomer having three to 12 carbon atoms can be modified to produce polymers having improved physical and chemical properties by reacting such alpha-olefin polymers with crotonic acid in the presence of a free radical source. These modified polymeric materials are of low molecular weight and are readily emulsifiable in nonionic emulsification systems.

The low viscosity homopolymers and copolymers of alpha-olefins containing at least one alpha-olefin monomer having at least three carbon atoms, which can be reacted with crotonic acid in the presence of a free radical source include for example, low viscosity homopolymers and copolymers containing propylene, butene-1, 4-methyl-1-pentene, 3-methyl-1-butene, 4,4-dimethyl-1-pentene, 3-methyl pentene-1, 4-methyl hexene-1, 5-ethyl hexene-1, 6-methyl heptene-1, hexene-1, heptene-1, octene-1, nonene-1, decene-1, dodecene-1, such as polypropylene, polybutene-1, propylene/butene-1 copolymer and the like. Copolymers containing these monomers and ethylene, can also be used such as ethylene-propylene copolymer, ethylene butene-1 copolymer and the like. Such poly-α-olefins can be either crystalline or amorphous, although the crystalline modified poly-α-olefins are generally more useful in floor polish applications.

These homopolymeric or copolymeric low viscosity poly-α-olefins can be prepared by thermally degrading high molecular weight α-olefin polymers prepared by conventional polymerization processes. For example, one such suitable conventional polymer is the highly crystalline polypropylene prepared according to U.S. Pat. No. 2,969,345. Thermal degradation of conventional homopolymers or copolymers is accomplished by heating at elevated temperatures causing the polymer chain to rupture apparently at the points of chain branching of the polymeric material. The degree of degradation is controlled by reaction time and temperature to give a thermally degraded low molecular weight crystallizable polymeric material having a melt viscosity range from about 20–500 cp. at 190°C. (ASTM D-1238-57T using 0.04 ± 0.0002 inch orifice), preferably about 25–200 cp. and most preferably about 25–100 cp. at 190°C. By carefully controlling the time, temperature and agitation, a thermally degraded poly-α-olefin of relatively narrower molecular weight range than the starting high molecular weight polymer is obtained. The degradation is carried out at a temperature from 290°C. to about 425°C. These low viscosity poly-α-olefins prepared by thermally degrading conventional high molecular weight polymers, such as for example polypropylene, are fairly high melting, hard waxy solids (ring and ball softening points range from about 145° to about 156°C.) and are not emulsifiable. Upon reaction with crotonic acid, thereby increasing the acid number, the thermally degraded polymer becomes emulsifiable.

The low viscosity thermally degraded poly-α-olefins are reacted with crotonic acid in the melt phase under an inert atmosphere, such as nitrogen. The reaction is carried out at temperatures above the melting point of the low viscosity polyolefin and generally less than 300°C., preferably from about 150°–200°C., in the presence of free radical sources. Temperatures below 200°C. are preferred because the product wax tends to become more colored when higher temperatures are used. Also above 200°C. it is necessary to use a pressure vessel as the reactor because of the volatility of the crotonic acid at the high temperatures. Although the preferred temperature for grafting is below 200°C., the actual temperature is primarily dependent upon the specific peroxide reactant used. The temperature, peroxide, and reaction time are chosen such that the peroxide decomposition is complete within a reasonable length of time, 0.5 to about 5 hours. For example, when ditertiary butyl peroxide is used a reaction temperature of about 170°C. is convenient. At 170°C. ditertiary butyl peroxide has a half-life of about 8 minutes. Generally, decomposition can be considered complete after about eight half-lives. With ditertiary butyl peroxide at 170°C. grafting should be complete after about 1 hour. If ditertiary butyl peroxide is used at a lower temperature of 150°C. where the half-life is about 1 hour, the reaction time would have to be much longer, about 8 hours. Thus the peroxide, reaction temperature, and reaction time are all chosen such that the grafting reaction can be completed within a reasonable time. Reaction temperatures where the peroxide has very short half-lives, a few minutes, are avoided because the peroxide will decompose so rapidly that adequate mixing with the polymer and crotonic acid does not occur.

Suitable free radical sources useful in the present invention are, for example, organic peroxides of the general structure R—O—O—R. The peroxides should be good H abstractors, capable of forming polymeric radicals by abstraction of H from the low viscosity polymer molecules. Such peroxides which are good H abstractors for poly-α-olefins are, for example, dicumyl peroxide and ditertiary butyl peroxide.

The extent of the reaction of the low viscosity poly-olefin and crotonic acid is determined by the concentrations of crotonic acid and peroxide used in the reaction. Preferably, about 1 to 30 parts per hundred of crotonic acid, based on the weight of the low viscosity poly-olefin, can be used in the invention. The amount of free radical agent used is generally quite low being of the order of about 1 to about 6 pph, based on the weight of the low viscosity poly-α-olefin. It is preferred to use the smallest amount of crotonic acid and peroxide necessary to obtain a wax with good emulsifiability. In one preferred embodiment, the concentration of crotonic acid is about 5 to about 10 pph of crotonic acid and about 3 to about 4 pph of peroxide such as ditertiary butyl peroxide, based on the weight of the low viscosity poly-α-olefin. At these acid and peroxide concentrations modified polymers, or graft copolymers, with acid numbers of about 12 to about 25 are obtained, corresponding to about 2 to 4 weight percent crotonic acid grafted onto the polypropylene. Therefore, only about 20 to 40 percent of the crotonic acid used in the reaction is actually grafted onto the polymer. Moreover, the use of higher concentrations of crotonic acid or peroxide tends to give wax products which while emulsifiable have a yellow color.

The preparation of graft copolymers of crotonic acid and degraded polypropylene with both good color and good emulsifiability therefore depends on a critical balance of viscosity and acid number in the product. It was discovered that only a limited amount of crotonic acid can be grafted onto polypropylene without using excessive, uneconomical amounts of crotonic acid and peroxide catalysts. For example, a wax with an acid number of about 20 (corresponding to about 3 weight percent grafted crotonic acid) can be made using 10 pph of crotonic acid and 3 pph of ditertiary butyl peroxide catalyst based on the weight of polypropylene used. A number of such waxes were made with acid numbers of about 20 and Brookfield viscosities ranging from 200 centipoise to 2,000 centipoise at 190°C. The waxes having viscosities greater than 500 cp. formed very poor emulsions. The waxes prepared from polyolefins such as polypropylenes having melt viscosities in the range of 20 centipoise to 100 centipoise at 190°C., which were reacted to obtain 20 acid number graft copolymers gave excellent emulsions with high clarity and good color. Because of the low degree of grafting and the nature of the monomer, crotonic acid, these low viscosity graft copolymers have excellent color, being off-white in solid chunks and having Gardner colors of 1 to 3 in the melt. Further, these low acid numbers, low viscosity graft copolymers of crotonic acid and degraded polypropylene give excellent emulsions with low color and are useful as emulsifiable waxes.

The grafting reaction may be carried out either in a batchwise or in a continuous manner with contact times in the order of about 10 minutes to about 2 hours. These modified low molecular weight poly-α-olefin compositions have an acid number of at least 6, preferably about 7-30.

The acid number is determined in accordance with ASTM D-1386-59 with the following modifications:
a. Xylene is substituted for the ethanol-toluene mixture as the sample solvent.
b. A 0.05N sodium hydroxide in methanol solution is substituted for the 0.1N aqueous solution of sodium hydroxide.
c. The sample size is increased from 1-2 grams to 4.5 to 5.5 grams, and the weighing accuracy is changed from 0.001 to 0.0001 grams.

It has been observed in the present invention that the melt viscosity of the product increases slightly. This increase in melt viscosity may be due to a slight degree of crosslinking or to copolymerization of the poly-α-olefin with the crotonic acid. The grafting of the crotonic acid onto the low viscosity poly-α-olefin is carried out in an inert atmosphere. An inert atmosphere such as nitrogen prevents oxidation of the poly-α-olefin wax and helps to provide a colorless product.

The unreacted crotonic acid can be separated from the reaction mixture by purging the reaction mixture with an inert gas while the melt temperature is between 200° and 300°C. After the unreacted crotonic acid has been removed, the modified poly-α-olefin can be further purified by vacuum stripping or solvent extraction.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

The low viscosity poly-α-olefins can be prepared by thermally degrading high molecular weight polymer having an I.V. greater than 0.5. One such thermal degradation process is carried out by placing in a glass, round-bottomed flask about 250 g. of 90/10 propylene/1-butene copolymer having an I.V. of 1.9. The flask was purged with dry nitrogen to remove air and it was carefully immersed in a Wood's metal bath maintained at 350°C. After the polymer melted, it was stirred and maintained at 350°C. for 1 hour. The flask was removed from the metal bath. After the polymer had cooled to 200°C., it was poured from the flask onto a metal tray. The product had a melt viscosity of 1,500 cp. at 190°C. and an inherent viscosity of 0.27.

Low viscosity copolymers were also produced in the above manner from high molecular weight ethylene/propylene copolymer, ethylene/1-butene copolymer and propylene/1-pentene copolymer.

EXAMPLE 2

About 250 grams of highly crystallizable high molecular weight polypropylene having a heptane index of greater than 95 percent, and an inherent viscosity of about 2.0 was placed in a glass round-bottomed flask. The flask was purged with dry nitrogen to remove air and it was carefully immersed in a Wood's metal bath maintained at 350°C. After the polymer melted, it was stirred and maintained at 350°C. for about 1 hour. The flask was removed from the metal bath. After the polymer had cooled to about 200°C., it was poured from the flask onto a metal tray. On cooling to about ambient temperature, the hard brittle waxy material was easily granulated and had a melt viscosity of about 3,300 cp. at 190°C. and an inherent viscosity of about 0.42.

Low viscosity polymers were also produced in the above manner from high molecular weight poly-1-butene, poly-1-pentene, poly-1-hexene, poly-4-methyl-1-pentene and poly-1-dodecene.

EXAMPLE 3

Twelve hundred grams of degraded polypropylene having a melt viscosity of 50 cp. at 190°C. prepared according to Example 2 was melted under nitrogen in a four-necked, round-bottomed flask. One hundred twenty grams of crotonic acid were added to the polypropylene and well mixed with adequate stirring. The temperature of the mixture was brought up to 170°–175°C. and 36 grams of ditertiary butyl peroxide were added dropwise to the mixture over a period of about 30 minutes. Reaction was continued for an additional 30 minutes to allow time for complete destruction of all the peroxide. Unreacted crotonic acid and the volatile decomposition products of the peroxide catalyst were removed by raising the temperature of the reaction product to 190°–200°C. and sweeping with nitrogen for about an hour. The product was poured up in a silicon treated paper boat and allowed to cool.

The product was a wax with an off-white color in the solid. Molten, the wax had a Gardner color of 2. The wax had an acid number of 20, a Brookfield viscosity of 75 cp. at 190°C., a ring and ball softening point of 145°C., a penetration hardness of 0.1 mm$^{-1}$, and a density of 0.907 gram per cubic centimeter. The wax formed an excellent, transparent nonionic emulsion in the following manner:

One hundred twenty grams of wax, 36.0 grams of Igepal CO–530 emulsifier, [nonylphenoxy poly(ethyleneoxy) ethanol] 3.0 grams of potassium hydroxide (86 percent pellets), and 450 milliliters of distilled water were placed in a one-liter Parr stirred pressure reactor vessel and the vessel was sealed. The vessel was heated to 180°C. and held for 30 minutes. The emulsion was cooled rapidly by passing cold water through a cooling coil inside the pressure vessel. The resulting emulsion was of excellent quality. It was quite transparent (percent transmittance of 80) and formed a film on black glass which had excellent gloss and particle size. When the emulsion was added to standard floor polish formulations, the wax imparted excellent properties to the polish. In particular, the polish has outstanding slip resistance.

EXAMPLE 4

The grafting procedure of Example 3 was repeated except that the feed material was degraded crystalline ethylene-propylene copolymer containing about 1.5 weight percent ethylene and having a viscosity of 50 cp. at 190°C. prepared according to the procedure of Example 1. The emulsifiable product formed was an off-white wax with a Gardner color of 1+ in the melt. The wax had an acid number of 20.5, a Brookfield viscosity of 90 cp. at 190°C., a ring and ball softening point of 143°C., a penetration hardness of 2.0, and a density of 0.887 gram per cubic centimeter. The wax was emulsified by the same procedure as given in Example 3. The emulsion was very clear with a light pale blue color. The percent transmittance of the emulsion was 81.

EXAMPLE 5

Example 3 was repeated except that higher concentrations of crotonic acid and ditertiary butyl peroxide were used to make a higher acid number product. Twenty-five hundred grams of degraded polypropylene having a melt viscosity of 50 cp. at 190°C., 400 grams of crotonic acid (16 pph based on the polypropylene), and 175 grams of ditertiary butyl peroxide (7 pph) were reacted by the same procedure as given in Example 3. The product had an acid number of 30.0 and a Brookfield viscosity of 65 cp. at 190°C. The Gardner color in the melt was 4. The wax has a density of 0.879 gram per cubic centimeter, a penetration hardness of 1.0, and a ring and ball softening point of 147°C. The wax was emulsified by the same procedure as given in Example 3 except that 4.5 grams of potassium hydroxide were used because of the higher acid number.

EXAMPLE 6

Example 5 was repeated except that the crotonic acid and ditertiary butyl peroxide concentrations were increased to 20 pph and 10 pph, respectively. The product had an acid number of 40 and a Brookfield viscosity of 90 cp. The wax had a Gardner color of 5 in the melt with a density of 0.905 gram per centimeter, a penetration hardness of 1.2, and a ring and ball softening point of 140°C.

The wax was emulsified by heating 120 grams of the wax, 36 grams of Tergitol 15–S9 emulsifier (polyethylene glycol ether of a linear alcohol), 6.0 grams of 86 percent potassium hydroxide, and 410 milliliters of water to 180°C. in a stirred Parr reactor. The reactor was kept at 180°C. for 30 minutes and the emulsion was rapidly cooled to approximately 70°C. by running water through the cooling coils of the reactor. The emulsion was of excellent quality although it was colored a pale yellow. The percent transmittance of the emulsion was 87. When Igepal CO–530 [nonylphenoxy poly(ethyleneoxy) ethanol] was used as the emulsifier, unsatisfactory emulsions with poor transparency were obtained.

EXAMPLE 7

Polypropylene-crotonic acid graft copolymers were prepared and evaluated according to the procedures of Example 3 using degraded polypropylenes of different melt viscosities. The results are as follows:

| Run No. | Viscosity of Feed, cp. at 190°C. | Viscosity of Copolymer, cp. at 190°C. | Acid No. of Copolymer | % Transmittance of Nonionic Emulsion Prepared From Copolymer |
|---|---|---|---|---|
| 1 | 25 | 40 | 18.2 | 80 |
| 2 | 50 | 65 | 19.0 | 79 |
| 3 | 65 | 90 | 19.0 | 77 |
| 4 | 150 | 170 | 17.5 | 30 |

| Run No. | Viscosity of Feed, cp. at 190°C. | Viscosity of Copolymer, cp. at 190°C. | Acid No. of Copolymer | % Transmittance of Nonionic Emulsion Prepared From Copolymer |
|---|---|---|---|---|
| 5 | 3820 | 1000 | 19.5 | <5 |
| 6 | 500 | 570 | 18.5 | 15 |

As the viscosity of the feed material increases above about 100 cp., the emulsifiability of the product is adversely affected.

EXAMPLE 8

Four hundred grams of degraded polypropylene having a melt viscosity of 50 cp at 190°C. was melted under nitrogen in a four-necked, round-bottomed flask. Forty grams of maleic acid was added to the polypropylene and stirred to mix well. The mixture was brought to 170°–175°C. and 12 grams of ditertiary butyl peroxide was added dropwise over a period of about 30 minutes. A yellow color began to immediately develop after peroxide addition was begun. Reaction was continued for an additional 30 minutes after all peroxide had been added. Unreacted maleic acid and decomposition products of the peroxide were removed by raising the temperature to 190°–200°C. and sweeping the nitrogen for 1 hour.

The product was an emulsifiable wax with a Gardner color of 10 in the melt. The wax had an acid number of 47 and a Brookfield viscosity of 540 cp. at 190°C. This Example shows that the maleated polypropylene waxes while emulsifiable are unacceptable for use in applications such as floor polishes which require clear waxes.

EXAMPLE 9

Example 8 was repeated except that 4 pph (16 grams) of maleic acid were used. The wax product had a Gardner color of 5 in the melt, an acid number of 21.0, and a viscosity of 90 cp. at 190°C. This example shows that a maleated polypropylene wax having an acid number of 21 has significantly greater color than the emulsifiable wax of Example 3 having a similar acid number.

It was completely unexpected, therefore, that the process of the present invention would provide emulsifiable low molecular weight poly-α-olefin waxes having low color since reacting low viscosity poly-α-olefins with maleic anhydride in the presence of a free radical component, such as a peroxide, produces a highly colored wax.

The modified low molecular weight emulsifiable poly-α-olefin waxes of this invention are useful for many purposes including preparing nonionic emulsions which are excellent textile-treating agents which improve the scuff resistance of fabrics such as permanently creased cotton fabrics. The emulsions are also useful in floor polish compositions providing scuff resistant, hard, glossy clear finishes.

The invention has been described in detail with particular reference to certain preferred embodiments thereof, but it will be understood that variations and modifications can be effected within the spirit and scope of the invention.

I claim:

1. An emulsifiable poly-alpha-olefin wax having an acid number of from 6 to 30 and melt viscosity greater than 20 centipoise at 190°C. prepared by reacting a thermally degraded low viscosity poly-alpha-olefin containing at least one alpha olefin monomer having at least three carbon atoms and a melt viscosity of about 20–500 cp. at 190°C. with crotonic acid in the presence of a free radical source.

2. An emulsifiable poly-alpha-olefin wax according to claim 1 wherein said low viscosity poly-alpha-olefin is a poly-alpha-olefin homopolymer.

3. An emulsifiable poly-alpha-olefin wax according to claim 1 wherein said low viscosity poly-alpha-olefin is a poly-alpha-olefin copolymer.

4. An emulsifiable poly-alpha-olefin wax according to claim 2 wherein said low viscosity poly-alpha-olefin has a melt viscosity of 25–200 cp. at 190°C.

5. An emulsifiable poly-alpha-olefin wax according to claim 3 wherein said low viscosity poly-alpha-olefin has a melt viscosity of 25–200 cp. at 190°C.

6. An emulsifiable poly-alpha-olefin wax according to claim 4 wherein said low voscosity poly-alpha-olefin has a melt viscosity of 25–100 at 190°C.

7. an emulsifiable poly-alpha-olefin wax according to claim 5 wherein said low viscosity poly-alpha-olefin has a melt viscosity of 25–100 cp. at 190°C.

8. an emulsifiable poly-alpha-olefin wax according to claim 6 wherein said low viscosity poly-alpha-olefin is polypropylene.

9. An emulsifiable poly-alpha-olefin wax according to claim 7 wherein said low viscosity poly-alpha-olefin is a crystalline ethylene propylene copolymer containing about 1.5 weight percent ethylene.

10. An emulsifiable poly-alpha-olefin wax according to claim 8 wherein said wax has an acid number of about 20.

11. An emulsifiable poly-alpha-olefin wax according to claim 9 wherein said low viscosity poly-alpha-olefin wax has an acid number of about 20.

* * * * *